United States Patent [19]

Kulkarni

[11] 4,065,694
[45] Dec. 27, 1977

[54] REGENERATIVE-CYCLE INCANDESCENT LAMP CONTAINING SNI4 ADDITIVE

[75] Inventor: Avinash D. Kulkarni, Montclair, N.J.

[73] Assignee: Westinghouse Electric Corporation, Pittsburgh, Pa.

[21] Appl. No.: 643,277

[22] Filed: Dec. 22, 1975

Related U.S. Application Data

[63] Continuation-in-part of Ser. No. 552,830, Feb. 25, 1975, abandoned.

[51] Int. Cl.² ............................................. H01K 1/50
[52] U.S. Cl. .................................................... 313/222
[58] Field of Search ......................................... 313/222

[56] References Cited

U.S. PATENT DOCUMENTS

| 2,883,571 | 4/1959 | Fridrich et al. | 313/222 X |
| 3,270,237 | 8/1966 | Danko | 313/222 X |
| 3,384,774 | 5/1968 | English | 313/222 |
| 3,416,022 | 12/1968 | Mayer | 313/222 X |
| 3,418,512 | 12/1968 | T'Jampens et al. | 313/222 X |
| 3,497,754 | 2/1970 | Johnson | 313/222 |
| 3,738,729 | 6/1973 | Coxon et al. | 313/222 X |

FOREIGN PATENT DOCUMENTS

| 131,576 | 9/1968 | Czechoslovakia. |
| 23,575 | 8/1971 | Japan. |

*Primary Examiner*—Palmer C. Demeo
*Attorney, Agent, or Firm*—D. S. Buleza

[57] ABSTRACT

The quality and useful life of regenerative-cycle type incandescent lamps that employ iodine as the halogen are enhanced by dosing the lamps with a carefully controlled amount of $SnI_4$ which decomposes when the lamp filament is energized and provides from about 0.05 to 0.20 micromole of vaporized elemental iodine per ml. of bulb volume within the lamp during operation. The resulting increase in the amount of iodine that is converted into atomic rather than molecular form within the energized lamp permits elongated iodine-cycle lamps having singly-coiled filaments to be operated in any position in contrast to conventional iodine-cycle lamps of the same configuration and construction that exhibit early blackening of the top portion of the envelope when the lamp is operated in a vertical position. The undesirable light-absorption and color distortion effects characteristic of conventional iodine-dosed lamps are also reduced, thus increasing the lamp efficiency.

6 Claims, 3 Drawing Figures

REGENERATIVE-CYCLE INCANDESCENT LAMP CONTAINING SnI₄ ADDITIVE

CROSS-REFERENCE TO RELATED APPLICATION

This application is a continuation-in-part of application Ser. No. 552,830 filed Feb. 25, 1975 (now abandoned).

BACKGROUND OF THE INVENTION

1. Field of the Invention

This invention relates to electric lamps and has particular reference to an improved incandescent lamp of the iodine-cycle type.

2. Description of the Prior Art

Halogen incandescent lamps are per se well known in the art and a lamp of this type in which the regenerative-cycle is established and sustained by a small quantity of elemental iodine (from 0.01 to 1 micromole per cm$^3$ or ml. of bulb volume) is described in U.S. Pat. No. 2,883,571 issued Apr. 21, 1959 to E. G. Fridrich et al. A method of making such a lamp in which the iodine is introduced into the lamp envelope in the form of an iodide or hydroiodide of an element of Group IV of the Periodic Table (carbon, silicon, titanium, germanium, zirconium, tin, hafnium, lead, and thorium) which is an involatile solid at room temperature is disclosed in U.S. Pat. No. 3,738,729 issued June 12, 1973 to G. E. Coxon et al. CHI$_3$, CI$_4$, GeI$_4$ and SiI$_4$ are the only compounds specifically disclosed and they are preferred.

The broad concept of dosing an incandescent lamp with a tin halide (such as SnI$_2$, SnI$_4$, SnBr$_2$, SnBr$_4$, SnCl$_2$ and combinations thereof) to provide both iodine and a vaporized tin halide in the fill gas is disclosed in Japanese Utility Design Publication No. 1971-23575 dated Aug. 13, 1971 (applied for by Toshiba Electric Co.). However, no information regarding dosing amounts or ranges for any of the tin halide additives is given. In addition, the lamp is specifically designed to have a bulb wall temperature higher than 500° C in order to surround the filament with vaporized tin halide so that the latter, by virtue of its high molecular weight, will inhibit tungsten evaporation from the filament.

A decorative type incandescent lamp that contains large amounts of elemental iodine (at least 15 milligrams per ml. of envelope volume) either alone or in combination with a vapor of various metallic iodides, including tin iodide, and which is operated in a vertical position and produces a luminous pulsating colored flame effect is disclosed in U.S. Pat. No. 3,384,774 issued May 21, 1968 to J. F. English. The minimum amount of elemental iodine required to produce the pulsating-flame effect is much greater than the maximum amount (about 1 micromole per ml. of envelope volume) required in the conventional iodine-cycle lamps that are disclosed in the aforementioned Fridrich et al patent and are used for general lighting purposes.

A high efficiency incandescent lamp that contains a tungsten filament, a quantity of mercury sufficient to provide from 1 to 20 atmospheres (760 to 15,200 torr) of mercury vapor within the operating lamp, and at least one vaporizable metallic halide (including a tin halide) which is wholly or partially converted to the vapor state and is thus thermally excited to cause the metal to emit light emission of its characteristic atomic spectra is disclosed in U.S. Pat. No. 3,497,754 issued Feb. 24, 1970 to P. D. Johnson.

An incandescent lamp that contains a tantalum carbide filament and an atmosphere (at operating temperature) which comprises hydrogen, vaporized carbon, an inert fill gas, and one or two halogens (at least one of which is iodine or bromine obtained from a metal halide such as a halide of rubidium, cobalt, tin, silver, cadmium, aluminum, copper, zinc, mercury, nickel, and cerium) is disclosed in British patent specification No. 900,200 of H. M. Bryant and D. P. Cooper, Jr. (complete specification published July 4, 1962).

Tungsten-filament lamps that are dosed with other types of halide compounds (such as HgI$_2$ and HgBr$_2$) are disclosed in Czechoslovakian Pat. No. 131,567 of J. Pavlata and in British patent specification Nos. 952,938 and 1,105,291 granted to J. Bowtell et al and J. Moore et al, respectively.

Despite the improvements made in halogen-cycle type incandescent lamps, it has been found that when tubular lamps which have been dosed with elemental iodine in the conventional manner and have long singly-coiled filaments and long design lives (over 1,000 hours nominal) are operated in a vertical position, premature blackening of the uppermost portion of the lamp envelope occurs. To avoid this problem, such conventional iodine-cycle lamps are generally restricted to a burning position that is within 4° or so of horizontal. Since this limitation obviously impairs the commercial usefulness of such lamps, a practical and inexpensive way of correcting this deficiency and providing an elongated iodine-cycle lamp which has a singly-coiled filament and can be operated in any position throughout its design life without premature blackening would be a valuable contribution to the art.

Halogen lamps dosed with the usual amount of elemental iodine in accordance with the prior art teachings also have a pale violet-like color or tint which not only distorts the color of the light produced by the lamp but also filters or attenuates the light rays and thus reduces the lamp efficiency.

Hence, an iodine-cycle lamp which would operate with little or no color distortion or filtering of the generated light rays and which has a "universal burning" capability as regards lamp orientation, as well as a long useful life and high efficiency, would be even more desirable and advantageous.

One approach suggested to remedy these shortcomings was to redesign the lamp so that it would have a much higher operating temperature sufficient to cause almost all of the molecular iodine within the lamp to dissociate into iodine atoms (article entitled "Incandescent Bromine Cycle Lamps" by F. A. Mosby et al; April 1967 issue of Illuminating Engineering, p. 198). However, such elevated lamp-operating temperatures are impractical because of the high seal temperatures and other problems which they inherently create.

SUMMARY OF THE INVENTION

It has been discovered that all of the above objectives can be obtained in a simple, practical and inexpensive manner by dosing the lamp with a small carefully controlled amount of SnI$_4$ so that the quantity of elemental iodine which is released within the lamp is restricted to a narrow range and the level of iodine activity within the operating lamp is kept to a minimum, consistent of course with the requirements for sustaining the desired tungsten-iodine cycle. Under such conditions, it has been found that the major portion of the released elemental iodine within the energized lamp is in an atomic rather than a molecular state. The dissociation of molecular iodine ($I_2$) into iodine atoms (I) is thus achieved by reducing the amount of elemental or "free" iodine that is made available within the energized lamp instead of increasing the operating temperature of the lamp, as suggested by the prior art.

In accordance with the present invention, the lamp is dosed with an amount of $SnI_4$ which provides from about 0.05 to 0.2 micromole of free or elemental iodine per ml. of lamp volume within the energized lamp. This is equivalent to a partial pressure of from about 1 to 4 torr of iodine (at room temperature). Lamps dosed in this manner can be operated in either a horizontal or vertical position and thus have the desired "universal burning" capability which enables them to be used in lighting applications and fixtures which require that the lamp be oriented in a non-horizontal position. The lamps also have a higher efficiency, longer life and are substantially free of the color distortion and light-filtering effects exhibited by conventionally dosed iodine-cycle lamps.

Since $SnI_4$ is less toxic and more chemically stable than elemental iodine, its use as a dosing material for iodine-cycle lamps not only simplifies the manufacture of such lamps on a mass production basis but eliminates potential health hazards.

BRIEF DESCRIPTION OF THE DRAWING

A better understanding of the invention will be obtained from the exemplary embodiment shown in the accompanying drawing, in which.

DESCRIPTION OF THE PREFERRED EMBODIMENT

Figure 1:
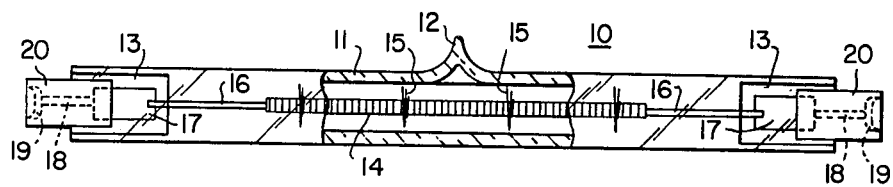
FIG. 1 is an enlarged front elevational view of a 500 watt T-3 type iodine-cycle incandescent lamp embodying the invention, a portion of the envelope being removed for illustrative purposes.

A representative iodine-cycle incandescent lamp 10 of the double-ended variety which embodies the present invention is shown in FIG. 1. The lamp 10 has an elongated tubular envelope 11 of suitable light-transmitting material, such as quartz or borosilicate glass (or other hard glass which principally comprises fused silica), that has a high melting point and can withstand the elevated operating temperatures involved as well as the effects of the iodine-containing atmosphere without becoming deformed or chemically attacked.

The envelope 11 is of circular cross-section and is hermetically sealed by a fused tipped-off segment 12 of an exhaust tubulation and by press seals 13 that are formed at each of its ends. The lamp 10 contains a suitable inert gas (such as argon, krypton, xenon, nitrogen or a mixture of such gases) and a singly-coiled tungsten filament 14. The filament 14 is suspended in centrally-located position within the envelope 11 by a series of attached helical support wires 15 of tungsten and by suitable conductor means such as a pair of tungsten (or molybdenum) inner leads 16 that are secured to the ends of the filament coil and have their opposite ends embedded in the respective press seals 13. The embedded ends of the inner leads 16 are electrically connected to strips 17 of molybdenum foil or ribbon that are also embedded in the respective seals 13 and, in turn, are fastened to outer leads 18 of molybdenum that are terminated by metal contactor buttons 19 which serve as the lamp terminals. The protruding ends of the outer leads and associated portions of the terminal buttons are protectively enclosed in ceramic sleeves 20 that are secured to the press seals 13 with a suitable cement in accordance with standard lamp-making practice.

The filament 14 is wound from wire that is composed essentially of tungsten but may contain small amounts of thorium and other dopants to improve its strength, etc.

The physical size of the filament 14 relative to that of the tubular envelope 11 is such that the inner surface of the envelope will reach a temperature of at least 250° C and the temperature in the space surrounding the filament will reach approximately 1027° C (about 1300° K) when the lamp 10 is operated at its rated voltage and wattage. The lamp is thus quite compact and can be made in a variety of lengths and ratings ranging from 300 watts to 1500 watts. For example, a 500 watt T-3 lamp of the double-ended type (such as that shown in FIG. 1) which is designed to operate at 120 volts and 4.17 amperes for an average life of 2,000 hours has an overall length of 11.8 centimeters, a singly-coiled filament approximately 5.1 centimeters long and 1.5 mm. in diameter, a quartz envelope with an outer diameter of approximately 9.5 millimeters, and an internal volume of 2.7 ml.

In accordance with the present invention, the envelope 11 is dosed with a small but carefully controlled amount of tin tetraiodide ($SnI_4$) before it is sealed. The amount of $SnI_4$ placed in the lamp 10 is such that from about 0.05 to 0.21 micromole of elemental or "free" iodine per ml. of lamp volume is present within the envelope 11 when the lamp 10 is energized and the $SnI_4$ is decomposed by the heat and various radiations generated by the incandescent filament 14. This is equivalent to a partial pressure of elemental iodine of from about 1 to 4 torr (at room temperature or 27° C) and a $SnI_4$ dosage of from about 0.025 to 0.11 micromole per ml. of lamp volume.

Due to the thermodynamic equilibrium conditions that prevail within the lamp 10 at the gas temperatures involved (in the order of 1027° C), only a small portion of the total iodine content of the $SnI_4$ which is dosed into the lamp 10 is actually converted into elemental iodine vapor if there is an excess of $SnI_4$. Under such conditions, some of the $SnI_4$ will be converted into $SnI_2$ and stays in this form while the lamp is energized.

Since the amount of elemental iodine which is actually present within the operating lamp 10 is governed by the operating gas temperature within the lamp and the aforementioned thermodynamic equilibrium phenomenon, any iodine which may be lost by "gettering action" or other causes during the lifetime of the lamp will automatically be replaced. The quantity of elemental iodine in the energized lamp is thus replenished from the reservoir of $SnI_4$ and remains at a substantially constant value. The finished lamp 10 can accordingly contain an excess amount of $SnI_4$ additive. Thus, up to about 0.5 micromole of $SnI_4$ per ml. of lamp volume can be dosed into the lamp. The total iodine content of this amount of $SnI_4$ is quite large (about 20 torr at 27° C) but only a fraction of it is released and is active within the energized lamp.

The pressure of the inert fill gas is not especially critical and can be in the range of from about 1,000 to 5,000 torr (at room temperature). Fill gas pressures in excess of 3,000 torr or so require the use of envelopes with increased wall thickness and strength to avoid the potential danger of envelope rupture. To avoid such problems, the fill gas pressure is preferably maintained within a range of from about 1,200 to 3,000 torr and excellent results in the case of 500 watt T-3 quartz lamps of the type shown in FIG. 1 have been obtained by filling the lamps with from 1,500 to 2,500 torr of argon. Lamps of this rating and type containing approximately 3 atmospheres of argon (2,280 torr) and dosed with an amount of $SnI_4$ which has a total iodine content equivalent to 10 torr partial pressure operated in a vertical position with an efficiency of 21.7 lumens per watt and had an average useful life of 2,865 hours. The same lamp type dosed with elemental iodine in the conventional manner has a nominal efficiency of 20 LPW and a nominal design life of 2,000 hours but will blacken early in life if burned in a vertical position.

Of course, the useful life of lamps embodying the invention can be further increased by redesigning the filament coil to operate at a lower temperature sufficient to provide the nominal efficiency of 20 LPW—thus converting the increased efficiency obtained into additional hours of burning.

T-3 type lamps (singly-coiled filament) of the 500 watt size embodying the invention have been operated in a vertical position for their design life of 2,000 hours without exhibiting premature blackening.

Specific examples of the partial pressures of iodine (total content) and the equivalent amounts of iodine per ml. of lamp volume provided by various amounts of $SnI_4$ dosed into a 500 watt T-3 lamp of the type shown and described (internal volume of 2.7 ml.) are given below in Table I.

TABLE I

| Partial Pressure of Total Iodine (Torr at 27° C.) | Micromole of Total Iodine (per ml. of Lamp Vol.) | Micromole of $SnI_4$ (per ml. of Lamp Vol.) | Amount of $SnI_4$ Dosed Into Lamp (milligrams) |
| --- | --- | --- | --- |
| 1.0 | 0.05 | 0.025 | 0.046 |
| 2.0 | 0.11 | 0.055 | 0.092 |
| 3.0 | 0.16 | 0.080 | 0.14 |
| 4.0 | 0.21 | 0.11 | 0.184 |
| 5.0 | 0.27 | 0.135 | 0.23 |
| 10.0 | 0.54 | 0.270 | 0.46 |
| 20.0 | 1.07 | 0.535 | 0.91 |

The partial pressures for the iodine contents of the dosed lamps given above are based on room temperature (27° C) and on the supposition that all of the iodine present in the $SnI_4$ additive is converted into elemental iodine gas or vapor at 27° C.

Figure 2:
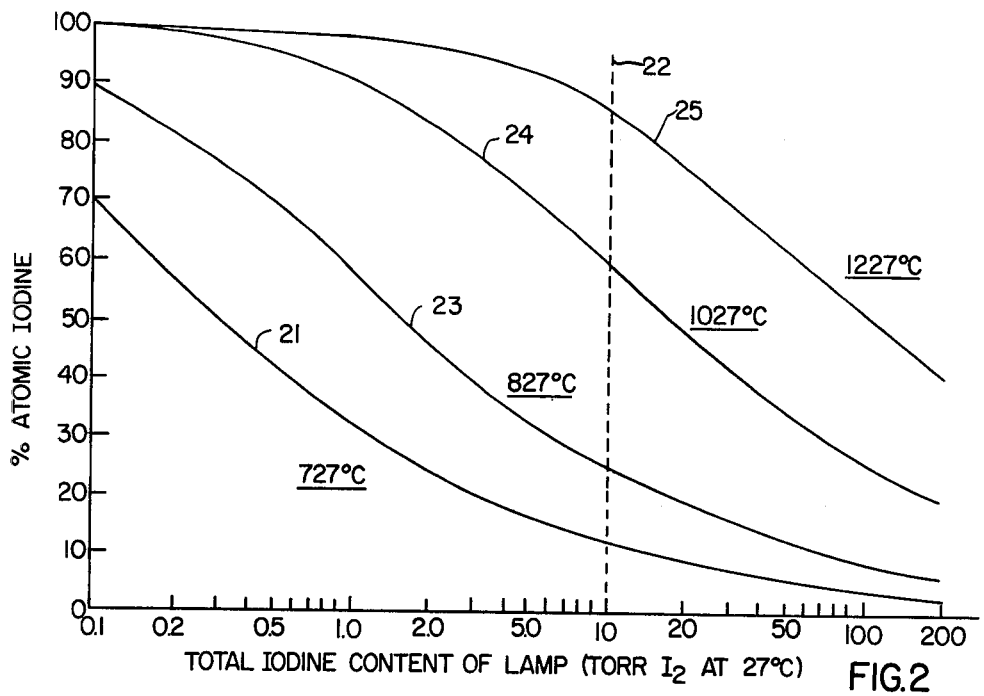
FIG. 2 is a graph illustrating the thermodynamic relationship of the atomic iodine content of an iodine-cycle lamp and the total iodine content at various operating temperatures.

As shown in the graph of FIG. 2, thermodynamic calculations indicate that the amount of elemental iodine within a given lamp which dissociates and is converted from molecular form ($I_2$) into atomic form (I) varies according to the gas temperature within the energized lamp and the total iodine content. Curve 21 (and the dashed reference line 22) show that at a gas temperature of about 727° C and a total iodine content equivalent to 10 torr partial pressure, only about 12% of the iodine is in an atomic state. At a gas temperature of 827° C, the amount of atomic iodine at 10 torr (total iodine) increases to about 25% (curve 23). At the gas temperature (1027° C) which prevails within a lamp of the type shown in FIG. 1, curve 24 shows that approximately 60% of the iodine (at such an iodine loading) is present in atomic form. At still higher gas temperatures such as 1227° C (curve 25), practically all (86%) of the iodine available at a dosage loading of 10 torr is present in an atomic state. As will be noted, the percent of iodine in atomic form increases as the gas temperature is increased and also increases as the total iodine content (dosage) of the lamp is decreased. Hence, at a gas temperature of 1027° C, decreasing the total iodine content from 20 torr to 2 torr decreases the amount of molecular iodine ($I_2$) within the operating lamp by a factor of 33 and not just 10.

The required amount of $SnI_4$ can be introduced into the lamp in various ways during lamp manufacture. For example, it can simply be dropped into the envelope through the exhaust tubulation before the latter is tipped-off and sealed. The $SnI_4$ can be pressed into pellets to facilitate dosing in this fashion. The $SnI_4$ can also be dissolved in a suitable volatile solvent, such as benzene or chloroform, and a measured volume of the resulting solution subsequently dispensed into the envelope 11 through the open exhaust tube.

When the finished lamps have been operated and are then de-energized, the decomposed $SnI_4$ recombines and condenses in the form of a thin film on the envelope walls which gives the lamps a distinctive yellowish-green color when they have cooled down to room temperature. However, this coloring disappears as soon as the lamps are again energized and the coating of condensed $SnI_4$ vaporizes and dissociates. The lamps are thus substantially colorless during operation.

Figure 3:
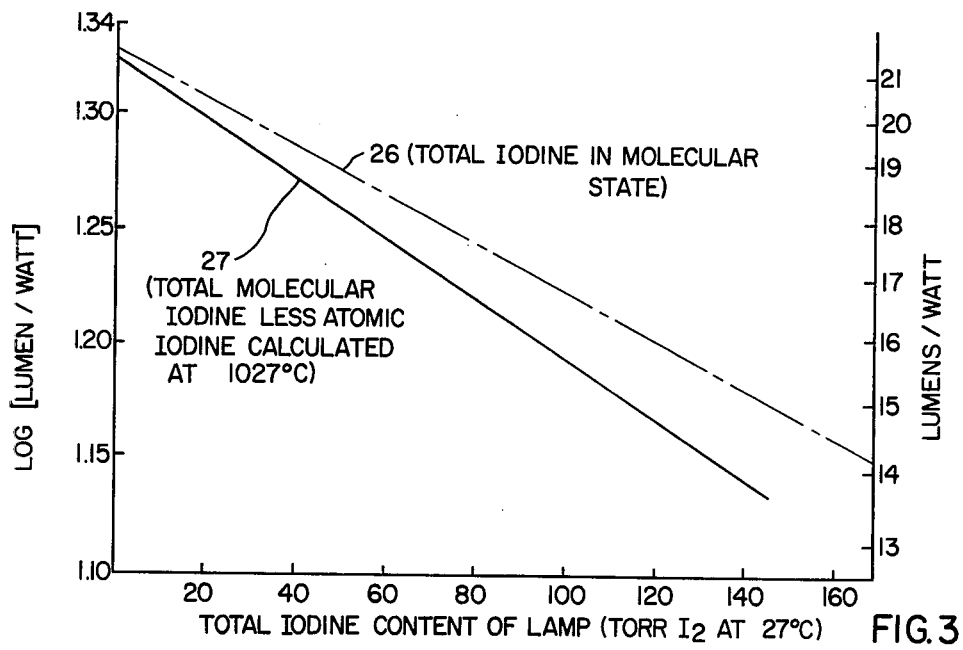
FIG. 3 is a graph depicting the manner in which the light output and efficiency of 500 watt T-3 type lamps decreases as the total iodine content is increased.

The deleterious effect of excess amounts of dosed iodine on the light output and efficiency of 500 T-3 lamps (of the type illustrated in FIG. 1) is shown graphically in FIG. 3. Curve 26 indicates that the efficiency (lumens per watt) drops from about 20.5 LPW at 20 torr iodine (total) to about 19.3 LPW when the total iodine content is increased to 40 torr, and that the efficiency progressively decreases as larger amounts of iodine are used.

Curve 27 shows that the decrease in efficiency with increasing iodine content is even more pronounced when the data is corrected for the presence of atomic iodine by substracting the amount of iodine which is in atomic form from the total iodine content (molecular state).

Comparative tests of 500 watt lamps of the singly-coiled filament type illustrated in FIG. 1 have shown that those dosed with $SnI_4$ in accordance with the invention exhibit no envelope-discoloration during burning in contrast to $HgI_2$ dosed lamps which exhibit a noticeable degree of blackening in the end portions of the envelope before reaching the end of their design lives (2,000 hours nominal).

I claim as my invention:

1. A regenerative-cycle incandescent lamp of elongated configuration that is adapted to be operated at a selected wattage and have a nominal design life in excess of 1000 hours when operated at said wattage, said lamp comprising;

a sealed envelope of light-transmitting material that contains a coiled filament which is composed essentially of tungsten and is supported in longitudinally-extending position within said envelope, a pair of spaced conductor means extending through said envelope and connected to said filament, an inert gas within said envelope at a pressure of at least 1000 torr, and means in said envelope for initiating and sustaining a tungsten-iodine cycle within the lamp during the operation thereof which inhibits discoloration of the envelope by vaporized tungsten even when the lamp is operated in a non-horizontal or vertical position at said selected wattage, said means consisting essentially of $SnI_4$ in an amount sufficient to provide from about 0.05 to 0.21 micromole per ml. of lamp volume of elemental iodine within the envelope when the lamp is operated at said selected wattage and the $SnI_4$ is subjected to the heat and radiant energy generated by the energized incandescent filament.

2. The regenerative-cycle incandescent lamp of claim 1 wherein the total iodine content of the $SnI_4$ initially present within the lamp is in the range of from about 0.05 to 0.5 micromole of iodine per ml. of lamp volume.

3. The regenerative-cycle incandescent lamp of claim 1 wherein said inert fill gas is a gas of the group consisting of nitrogen, argon, krypton, xenon, and mixtures thereof at a pressure of from about 1200 to 3000 torr.

4. The regenerative-cycle incandescent lamp of claim 1 wherein said lamp as manufactured contains from about 0.02 to 0.54 micromole of $SnI_4$ per ml. of lamp volume.

5. The regenerative-cycle incandescent lamp of claim 1 wherein;
said filament is of single-coiled construction and is fabricated from tungsten wire,
said selected wattage is in the range of from about 300 to 1500 watts,
said lamp has a nominal design life of approximately 2000 hours when operated at said selected wattage, and
the relative physical dimensions of said coiled filament and envelope are such that the gas temperature within the lamp is at least 1027° C when the lamp is operated at said selected wattage.

6. The regenerative-coiled incandescent lamp of claim 1 wherein;
said filament is of single-coiled construction and is coiled along substantially its entire length,
said envelope is of tubular elongated configuration and substantially circular cross-section, and
said pair of spaced conductor means are sealed through the respective ends of the envelope and are electrically connected to the associated ends of the filament and said lamp is thus of the double-ended type.

* * * * *